(12) United States Patent
Kobayashi et al.

(10) Patent No.: US 8,610,026 B2
(45) Date of Patent: Dec. 17, 2013

(54) LASER WELDING METHOD

(75) Inventors: Haruhiko Kobayashi, Tochigi-ken (JP);
Satoshi Ohkubo, Utsunomiya (JP);
Shinichi Miyasaka, Utsunomiya (JP);
Koji Oda, Sakura (JP); Naoki Takahashi, Utsunomiya (JP); Hideari Kamachi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 314 days.

(21) Appl. No.: 13/145,317

(22) PCT Filed: Dec. 2, 2009

(86) PCT No.: PCT/JP2009/070257
§ 371 (c)(1),
(2), (4) Date: Jul. 19, 2011

(87) PCT Pub. No.: WO2010/084665
PCT Pub. Date: Jul. 29, 2010

(65) Prior Publication Data
US 2011/0278266 A1 Nov. 17, 2011

(30) Foreign Application Priority Data

Jan. 20, 2009 (JP) ................................. 2009-010011

(51) Int. Cl.
*B23K 26/20* (2006.01)
*B23K 26/32* (2006.01)

(52) U.S. Cl.
USPC ..................................................... 219/121.64

(58) Field of Classification Search
USPC ................. 219/121.63, 121.64, 161
See application file for complete search history.

(56) References Cited

U.S. PATENT DOCUMENTS

| 4,847,467 A * | 7/1989 | Ausilio ..................... 219/121.63 |
| 6,528,756 B2 * | 3/2003 | Degawa et al. .......... 219/121.64 |
| 6,646,225 B1 * | 11/2003 | Wang et al. .............. 219/121.64 |
| 2007/0084835 A1 * | 4/2007 | Dinauer et al. .......... 219/121.64 |
| 2007/0210042 A1 * | 9/2007 | Forrest et al. ............ 219/121.64 |

FOREIGN PATENT DOCUMENTS

| JP | 62-21482 A * | 1/1987 |
| JP | 10-216974 A * | 8/1998 |
| JP | 3115456 B2 | 12/2000 |
| JP | 2003-311453 A | 11/2003 |

OTHER PUBLICATIONS

Chinese Office Action issued in Application No. 200980154900.9, dated Jul. 25, 2013, 11 pages.

* cited by examiner

*Primary Examiner* — Geoffrey S Evans
(74) *Attorney, Agent, or Firm* — Arent Fox LLP

(57) ABSTRACT

The method of lap-welding of metal plates using a laser beam, wherein at least one of the metal plates is surface-treated, includes putting a metal plate on the other metal plate and forming a gap between the metal plates so that gas generated at the treated surface at the time weld can be dissipated therethrough. A surface-treated first work and a surface-treated second work are placed one on the other and clamped by a clamp with an opening of the clamp centered at the location on the first work to be welded. Then a laser beam is directed to the location to form a weld. The beam is then directed near the inner periphery of the opening to form a heated portion so that the heated portion deflects to form a gap through which the gas generated at the treated surface dissipates thereby reducing gas pressure.

2 Claims, 7 Drawing Sheets

LASER WELDING METHOD

CROSS-REFERENCE TO RELATED APPLICATION

This application is a National Stage entry of International Application No. PCT/JP2009/070257, having an international filing date of Dec. 2, 2009; which claims priority to Japanese Application No.: 2009-010011, filed Jan. 20, 2009, the disclosure of each of which is hereby incorporated in its entirety by reference.

TECHNICAL FIELD

The present invention relates to a laser beam welding method (laser welding method) for workpieces in the form of metal sheets having superposed surfaces, at least one of which is surface-treated. Specifically, the present invention relates to a laser beam welding method which is capable of reducing the influence of gas produced from a surface-treated layer in a laser beam welding process as much as possible.

BACKGROUND ART

Heretofore, surface-treated metal sheets such as galvanized steel sheets have widely been used as structural members for automotive bodies, etc. In welding such metal sheets with a laser beam, a gas is produced from the metal of the surface-treated layers while the surface-treated layers and the metal sheets are being melted. It is well known in the art that part of the melted metal sheets is blown away to cause sputtering or internal defects under the pressure of the metal gas emitted from the surface-treated layers, thereby tending to cause a welding failure. It is also known in the art to overcome the above shortcoming by forming a gap as a space between the surface-treated metal sheets to allow the metal gas to diffuse into the gap for thereby welding the metal sheets without fail. There have been proposed a variety of processes for forming such a gap between the metal sheets. For example, Japanese Patent No. 3115456 discloses a process of forming a gap by keeping free one end of a metal sheet to which a laser beam is applied, based on the difference between volumetric shrinkages of stacked metal sheets caused when the melted metal sheets are solidified and cooled in a laser forming process.

SUMMARY OF THE INVENTION

In the general laser beam welding process, however, the welded region may not necessarily be positioned at an end of the metal sheets, but may be located in the vicinity of the center of the metal sheets. In the case where the welded region is located in the vicinity of the center of the metal sheets, it will be difficult to diffuse the gas emitted from the surface-treated layers.

As described above, the laser forming process is used as a process of forming a gap regardless of the position where metal sheets are welded using a laser beam. However, the laser forming process is problematic in that a desired gap may not be formed due to a change in the rigidity of the metal sheets which is caused depending on the position or shape of the metal sheets or the way in which the metal sheets are clamped.

The present invention has been made in view of the above problems. It is an object of the present invention to provide a laser beam welding method which allows a gas produced from the metal of surface-treated layers of metal sheets when the metal sheets are welded using a laser beam, to be diffused regardless of the position or shape of the metal sheets or the way in which the metal sheets are clamped, so that the metal sheets can stably be welded without sputtering and internal defects, resulting in a product of excellent welding quality.

According to the present invention, there is provided a laser beam welding method for welding, with laser beams, first and second workpieces stacked one on the other, which comprise metal sheets including superposed surfaces, at least one of the superposed surfaces being surface-treated, comprising the first step of clamping a portion of the first workpiece around a welding spot with a clamping jig having an opening, the second step of, after the first step, applying one of the laser beams to the welding spot to form a melted region, the third step of, after the second step, applying the one of the laser beams to a portion of the first workpiece around the melted region to form a heated region, thereby forming a gap between the superposed surfaces of the first workpiece and the second workpiece, and the fourth step of, after the third step, applying the other of the laser beams to the welding spot to weld the first workpiece and the second workpiece to each other, and diffusing, into the gap, a gas which is produced from surface-treated layers during a period in which the first workpiece and the second workpiece are welded to each other.

Therefore, a gas which is produced from the metal of the surface-treated layers when the metal sheets are welded is diffused regardless of the position or shape of the metal sheets or the way in which the metal sheets are clamped, so that the metal sheets can stably be welded without sputtering and internal defects, resulting in a product of excellent welding quality.

The clamping jig may have at least one vent port communicating with the exterior of the clamping jig, and the heated region may include a forming-missing portion corresponding to the vent port.

The gas which is produced from the metal of the surface-treated layers when the metal sheets are welded is thus diffused and discharged to the outside through the forming-missing portion.

With the laser beam welding method according to the present invention, a gap or a discharge port having a desired size for diffusing a gas is formed between the stacked workpieces regardless of the position or shape of the steel sheets or the way in which the metal sheets are clamped, for diffusing a gas which is produced from the metal of the surface-treated layer when the metal sheets are welded. As a result, the pressure of the gas produced from the surface-treated layer when the metal sheets are welded with the laser beams is lowered, so that sputtering and internal defects are prevented from being caused, and the metal sheets can stably be welded with laser beams, resulting in a product of excellent quality.

DESCRIPTION OF THE EMBODIMENTS

Laser beam welding methods according to preferred embodiments of the present invention in relation to apparatus for carrying out the beam welding methods will be described in detail below with reference to the accompanying drawings.

Figure 1:
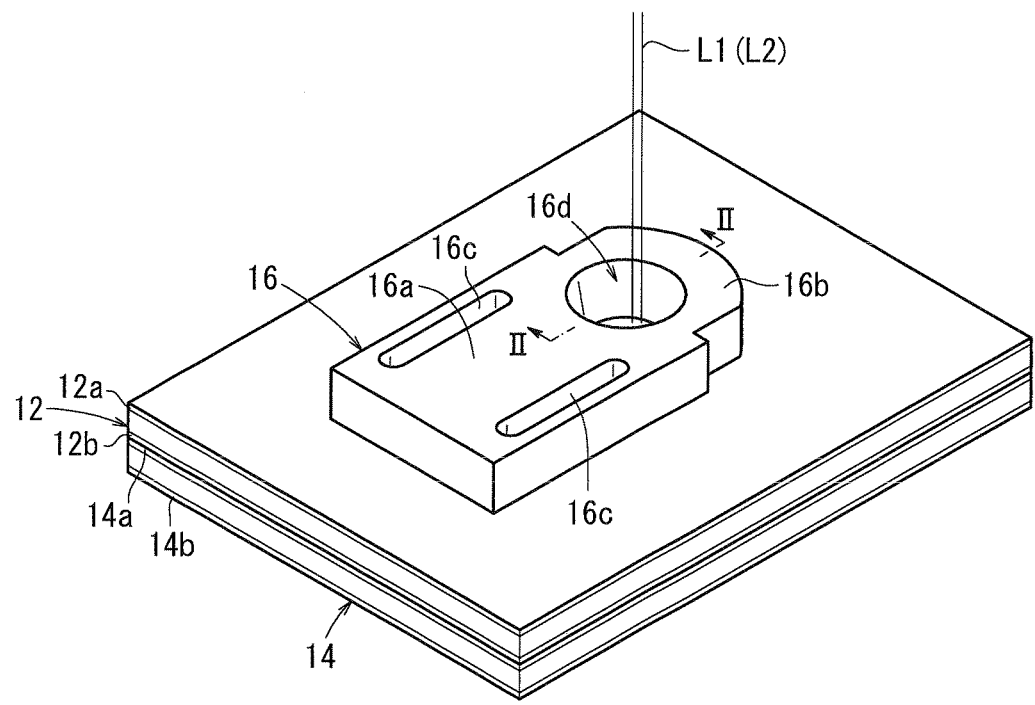
FIG. 1 is a perspective view showing the relationship between a clamping jig for carrying out a laser beam welding method according to a first embodiment of the present invention and workpieces.

As shown in FIG. 1, a laser beam welding method according a first embodiment of the present invention uses a first workpiece 12 in the form of a first metal sheet, a second workpiece 14 in the form of a second metal sheet, and a clamping jig 16. Laser beams are applied to the first workpiece 12 in a preliminary irradiation mode and a main irradiation mode, respectively.

According to the first embodiment, the first workpiece 12 includes an upper surface-treated layer 12a and a lower surface-treated layer 12b, and the second workpiece 14 includes an upper surface-treated layer 14a and a lower surface-treated layer 14b. Each of the upper surface-treated layer 12a, the lower surface-treated layer 12b, the upper surface-treated layer 14a, and the lower surface-treated layer 14b comprises a galvanized layer.

The clamping jig 16 is made of a metal which will not be melted by the laser beams that are used in the laser beam welding method. The clamping jig 16 includes a main body 16a in the shape of a rectangular parallelepiped and a semicircular holder 16b integral with the main body 16a. The main body 16a has a pair of lightening holes 16c defined therein near opposite ends along a longitudinal direction thereof. The holder 16b has a circular opening 16d defined therein. The opening 16d is of a circular shape whose diameter remains the same from one end to the other end. However, the opening 16d may be of a frustoconical shape whose diameter is progressively smaller toward the upper surface-treated layer 12a of the first workpiece 12. The frustoconical opening 16d allows the laser beam source to be positioned closely to the first workpiece 12 while at the same time being kept out of contact with the clamping jig 16, making it possible to apply the laser beams accurately to a welding spot. Furthermore, if the clamping jig 16 is of a frustoconical shape whose surface facing the laser beam source is wider than the surface thereof that is held in contact with the upper surface-treated layer 12a of the first workpiece 12, then the clamping jig 16 makes it easier to visually recognize the progress of a laser beam welding process.

A laser beam L1 which is initially used in the preliminary irradiation mode is set to an irradiating condition for heating or melting only the first workpiece 12 when the laser beam L1 is applied to the stack of the first workpiece 12 and the second workpiece 14 from the side of the first workpiece 12. The laser beam l1 may be of any of laser beam types, e.g., a fiber laser beam, a YAG laser beam, a $CO_2$ laser beam, a semiconductor-excited laser beam, etc.

A laser beam L2 which is used in the main irradiation mode is set to an irradiating condition for penetrating through the stacked first workpiece 12 and then traveling through a gap G1 to be described later, to the second workpiece 14 thereby to weld the first workpiece 12 and the second workpiece 14 to each other. The laser beam L2 used in the main irradiation mode may also be of any of laser beam types, as with the laser beam L1. The laser beam L2 may be the same as the laser beam L1, but may be a laser beam of different type which is emitted from a different laser beam source.

The steps of a laser beam welding process which is carried out using the clamping jig 16 of the above basic structure will be described below.

Figure 2A:
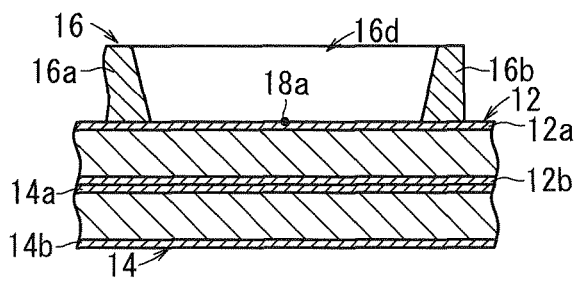
FIG. 2A is a fragmentary vertical cross-sectional view of the workpieces and the clamping jig after a first step.

As shown in FIG. 2A, in a first step, the first workpiece 12 and the second workpiece 14 are placed one on the other with the lower surface-treated layer 12b and the upper surface-treated layer 14a facing each other. Then, the first workpiece 12 is clamped by the clamping jig 16 which presses the first workpiece 12 around a welding spot 18a such that the welding spot 18a is positioned substantially at the center of the opening 16d of the clamping jig 16 held against the first workpiece 12. In other words, the clamping jig 16 is securely positioned on the first workpiece 12 such that the welding spot 18a is positioned substantially at the center of the opening 16d that is defined in the holder 16b of the clamping jig 16.

Figure 2B:
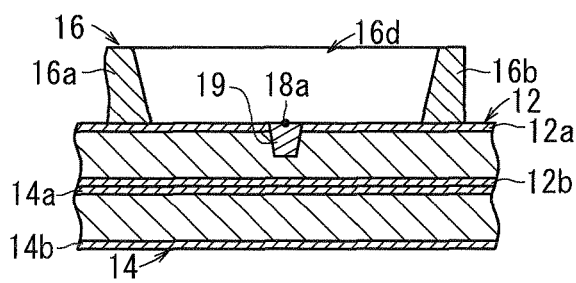
FIG. 2B is a fragmentary vertical cross-sectional view of the workpieces and the clamping jig after a melted region is formed in a second step.

Then, as shown in FIG. 2B, in a second step, the laser beam L1 is applied to the welding spot 18a in the preliminary irradiation mode. The welding spot 18a is heated and melted into a melted region 19. In this case, the melted region 19 does not extend through the first workpiece 12, but stays within the metal sheet of the first workpiece 12. Since the melted region 19 is formed by applying the laser beam L1 to the welding spot 18a in the preliminary irradiation mode, it will leave no trace after a fourth step, to be described later, and hence will not adversely affect the appearance of the first workpiece 12.

Figure 2C:
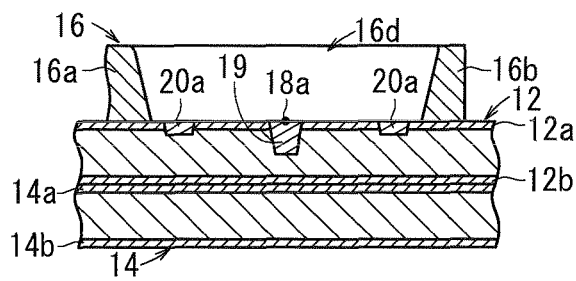
FIG. 2C is a fragmentary vertical cross-sectional view of the workpieces and the clamping jig after a heated region is formed in a third step.
Figure 3:
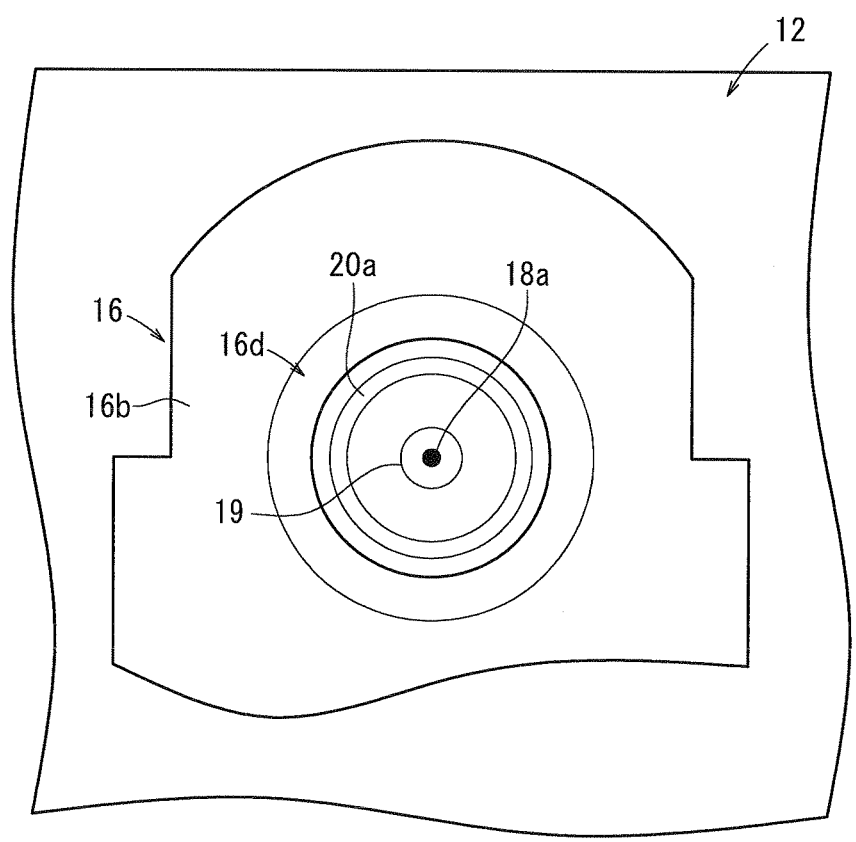
FIG. 3 is a fragmentary plan view of the workpieces and the clamping jig after the third step is completed.

Then, as shown in FIGS. 2C and 3, in a third step, while the melted region 19 remains in a melted state, the first workpiece 12 is scanned in a circular pattern around the melted region 19 with the laser beam L1 under an irradiating condition where irradiation is weaker than the irradiation of the laser beam L1 in the second step, i.e., under an output condition representing an output level lower than the output level of the laser beam L1 in the second step. At this time, the first workpiece 12 is heated along the scanned pattern so as not to be melted, thereby forming a heated region (formed region) 20a. As with the melted region 19, the heated region 20a stays within the metal sheet of the first workpiece 12. As can be seen from FIG. 2C, the amount of heat applied to the heated region 20a is smaller than the amount of heat applied to the melted region 19.

Figure 2D:
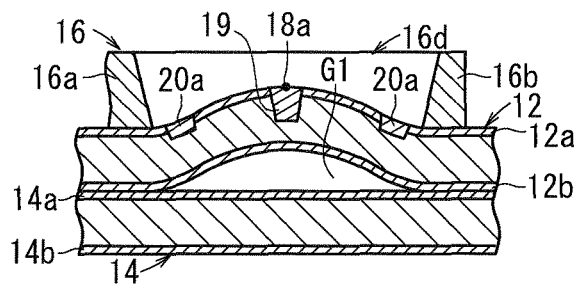
FIG. 2D is a fragmentary vertical cross-sectional view of the workpieces and the clamping jig after a gap is formed in the third step.

The heated region 20a is thermally expanded and then solidified and cooled. While the heated region 20a is being solidified and cooled, the first workpiece 12 undergoes a volumetric shrinkage due to the application thereto of the laser beam L1 in a wide area. As the heated region 20a stays in the first workpiece 12, volumetric shrinkage is greater in the upper surface-treated layer 12a than in the lower surface-treated layer 12b. Consequently, the upper surface-treated layer 12a is subjected to a force tending to pull the upper surface-treated layer 12a toward the outer edge of the opening 16d. Since the portion of the first workpiece 12 around the welding spot 18a is clamped by the holder 16b, the portion of the first workpiece 12 around the welding spot 18a is lifted in a direction of the upper surface-treated layer 12a. The melted region 19 formed in the second step is less rigid than before the first workpiece 12 is melted. Accordingly, the portion of the first workpiece 12 in the vicinity of the welding spot 18a becomes easy to lift in the direction of the upper surface-treated layer 12a. Furthermore, the heated region 20a formed in the third step is heated so as not to be melted, its rigidity is moderately lowered thereby to make it easy to control the bending of the first workpiece 12 reliably. As a result, a gap G1 (see FIG. 2D) is formed as a space between the lower surface-treated layer 12b of the first workpiece 12 and the upper surface-treated layer 14a of the second workpiece 14. The lower surface-treated layer 12b and the upper surface-treated layer 14a may hereinafter be also referred to as superposed surfaces.

Figure 2E:
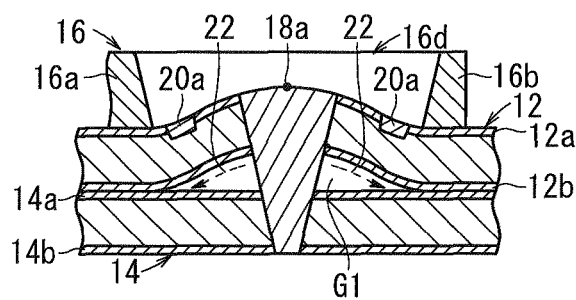
FIG. 2E is a fragmentary vertical cross-sectional view of the workpieces and the clamping jig after the welding process is completed.

Then, as shown in FIG. 2E, in a fourth step, the laser beam L2 is applied in the main irradiation mode to the welding spot 18a that is positioned substantially at the center of the opening 16d. The laser beam L2 penetrates through the first workpiece 12 and then travels through the gap G1 to the second workpiece 14. At this time, the region of the first workpiece 12 through which the laser beam L2 penetrates and a surrounding region therearound are melted, and then the first workpiece 12 and the second workpiece 14 are welded to each other. During this time, the regions of the lower surface-treated layer 12b and the upper surface-treated layer 14a through which the laser beam L2 penetrates and surrounding regions therearound are heated to or above a temperature at which the galvanized layers as the lower surface-treated layer 12b and the upper surface-treated layer 14a are evaporated, and then a zinc gas 22 is produced.

The produced zinc gas 22 is diffused into the gap G1 as indicated by the chain-line arrows in FIG. 2E. Because the gap G1 has been formed, the pressure of the zinc gas 22 in the gap G1 is low enough not to cause sputtering and internal defects at the welding spot 18a. As a consequence, the laser beam welding process is carried out stably, and a product of excellent welding quality is produced.

A laser beam welding method according to a second embodiment will be described below. Those parts used in the laser beam welding method according to the second embodiment which are identical to those used in the laser beam welding method according to the first embodiment are denoted by identical reference characters, and will not be described in detail below.

Figure 4:
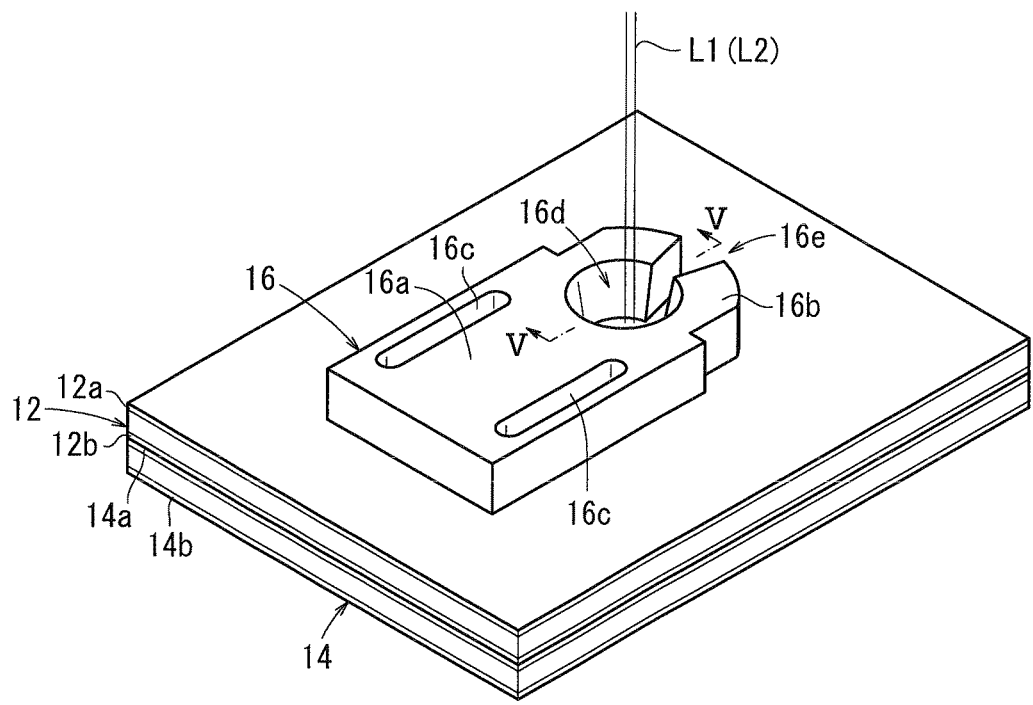
FIG. 4 is a perspective view showing the relationship between a clamping jig for carrying out a laser beam welding method according to a second embodiment of the present invention and workpieces.

As shown in FIG. 4, according to the second embodiment, the clamping jig 16 has an arcuate vent port 16e through which the opening 16d communicates with the exterior of the clamping jig 16. Specifically, the clamping jig 16 has the vent port 16e connected to the frustoconical opening 16d in the first embodiment. The vent port 16e may have an arcuate shape which angularly spreads at an angle from 20° to 40°, or preferably an angle of 30°, around the center of the opening 16d. The arcuate shape of the vent port 16e serves as a guide for scanning the first workpiece 12 at the time a heated region 20b to be described later is to be formed. As a result, the rigidity of the first workpiece 12 is appropriately lowered thereby to make it easy to form a gap G2 and a discharge port 28 to be described later.

Figure 5A:
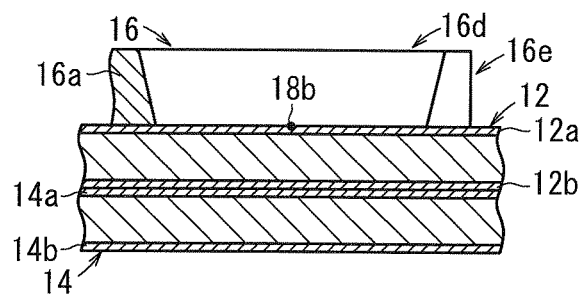
FIG. 5A is a fragmentary vertical cross-sectional view of the workpieces and the clamping jig after a first step.

The steps of a laser beam welding process which is carried out using the clamping jig 16 according to the second embodiment will be described below. As shown in FIG. 5A, in a first step, as in the first embodiment, a welding spot 18b is positioned at the center of the opening 16d of the holder 16b, and then part of the first workpiece 12 around the welding spot 18b is clamped by the clamping jig 16. As can easily be seen from FIG. 5A, a portion of the first workpiece 12 below the vent port 16e is not clamped because it is not pressed by the clamping jig 16.

Figure 5B:
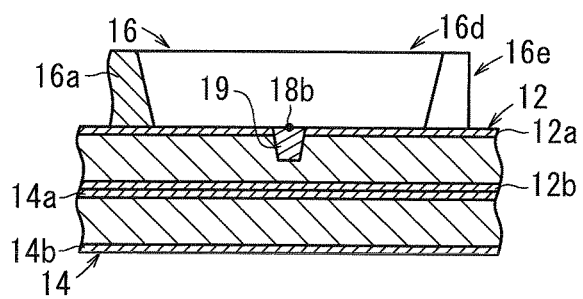
FIG. 5B is a fragmentary vertical cross-sectional view of the workpieces and the clamping jig after a melted region is formed in a second step.

Next, as shown in FIG. 5B, the laser beam L1 is applied to the welding spot 18b in a second step. The first workpiece 12 is heated and melted thereby to form a melted region 19. In this case, the melted region 19 does not extend through the first workpiece 12, but stays within the metal sheet of the first workpiece 12.

Figure 5C:
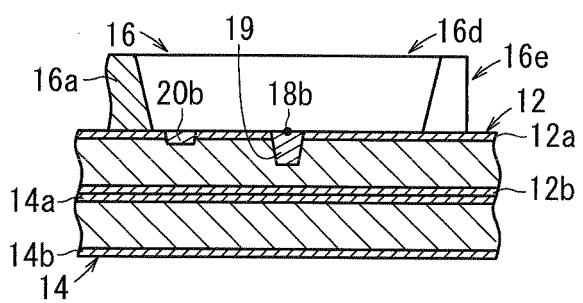
FIG. 5C is a fragmentary vertical cross-sectional view of the workpieces and the clamping jig after a heated region is formed in a third step.

Then, as shown in FIG. 5C, in a third step, the first workpiece 12 is scanned along an inner peripheral portion of the opening 16d, i.e., around the melted region 19, with the laser beam L1 applied to the first workpiece 12, thereby forming a heated region 20b. In this case, the laser beam L1 is not applied to a portion of the first workpiece 12 which corresponds to the vent port 16e. The heated region 20b has an arcuate shape without a portion corresponding to the vent port 16e as viewed in plan. The heated region 20b thus has a missing portion (hereinafter referred to as a forming-missing portion) 26 which angularly spreads at an angle from 20° to 40°, or preferably an angle of 30°, commensurate with the spreading angle of the vent port 16e. In the present embodiment, the heated region 20b is of an arcuate shape, i.e., the heated region 20b has a single forming-missing portion 26. However, the heated region 20b may have a plurality of forming-missing portions, e.g., may have two forming-missing portions, and the present invention is not limited to the single forming-missing portion 26. As a result, as many discharge ports 28, to be described later, as the number of forming-missing portions 26 may be provided, and the gap G2, to be described later, may communicate with the exterior of the clamping jig 16 through the discharge ports 28 for appropriately diffusing and discharging the zinc gas 22.

Figure 5D:
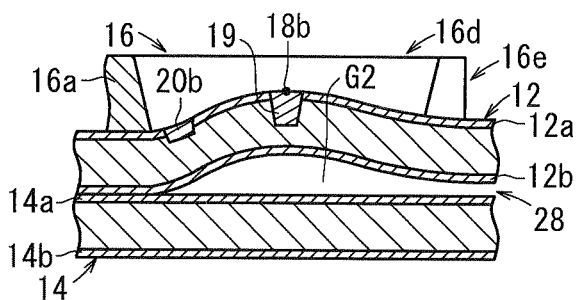
FIG. 5D is a fragmentary vertical cross-sectional view of the workpieces and the clamping jig after a gap is formed in the third step.

Consequently, the upper surface-treated layer 12a is subjected to a force, along the heated region 20b, tending to pull the upper surface-treated layer 12a toward the outer edge of the opening 16d. Since the first workpiece 12 is clamped except its portion corresponding to the vent port 16e in the first step and the melted region 19 is formed in the second step, the first workpiece 12 is lifted in a direction of the upper surface-treated layer 12a. In addition, the heated region 20b formed in the third step makes it easy to control the bending of the first workpiece 12 reliably. As a result, a gap G2 (see FIG. 5D) is formed as a space between the superposed surfaces. At this time, a discharge port 28 is formed between the superposed surfaces on account of the presence of the vent port 16e and the forming-missing portion 26.

Figure 5E:
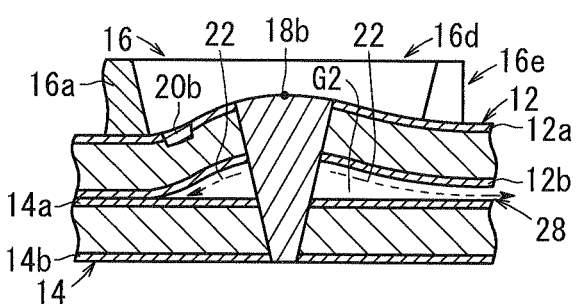
FIG. 5E is a fragmentary vertical cross-sectional view of the workpieces and the clamping jig after the welding process is completed.

Then, as shown in FIG. 5E, the laser beam L2 is applied in the main irradiation mode to the welding spot 18b that is positioned substantially at the center of the opening 16d, thereby welding the first workpiece 12 and the second workpiece 14 to each other. At this time, the lower surface-treated layer 12b and the upper surface-treated layer 14a are heated to or above a temperature at which the galvanized layers are evaporated, and then a zinc gas 22 is produced.

The produced zinc gas 22 is diffused into the gap G2 and discharged from the discharge port 28 as indicated by the chain-line arrows in FIG. 5E. Therefore, the pressure of the zinc gas 22 in the gap G2 is low enough not to cause sputtering at the welding spot 18b. As a consequence, the laser beam welding process is carried out stably, and a product of excellent welding quality is produced.

Figure 6:
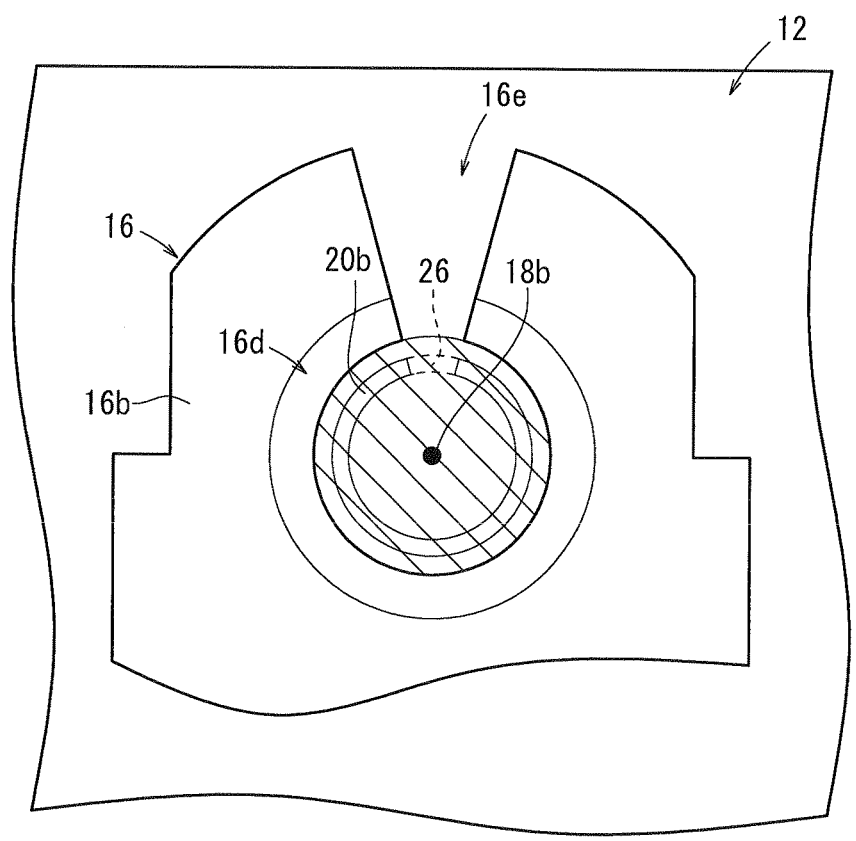
FIG. 6 is a fragmentary plan view of the workpieces and the clamping jig after the second step is completed according to a modification of the second embodiment.

According to a modification, as shown hatched in FIG. 6, the laser beam L1 may be applied to the portion of the workpiece 12 within the opening 16d to heat that portion within the opening 16d in its entirety. The rigidity of the first workpiece 12 may thus be lowered, thereby making it easy to form the gap G2.

In the above embodiments, each of the first workpiece 12 and the second workpiece 14 has its upper and lower surfaces treated by galvanizing. However, the laser beam welding method according to the present invention is effectively applicable insofar as at least one of the superposed surfaces, i.e., at least one of the lower surface-treated layer 12b and the upper surface-treated layer 14a, is galvanized.

Figure 7:
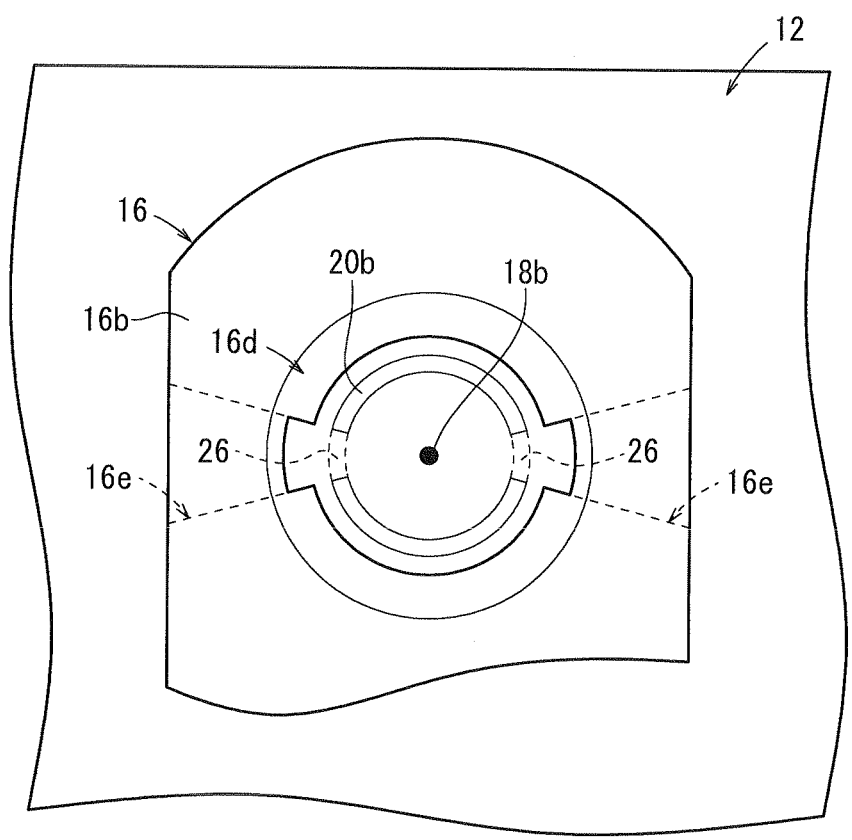
FIG. 7 is a fragmentary plan view showing a clamping jig with a plurality of vent ports defined in the bottom thereof.

In the above embodiments, furthermore, the clamping jig 16 has the single arcuate vent port 16e. However, as indicated by the broken lines in FIG. 7, the clamping jig 16 may have a plurality of vent ports 16e, e.g., two or more vent ports 16e, by cutting off portions from the bottom surface of the clamping jig 16, and thus the present invention is not limited to the single vent port 16e. As a result, as many discharge ports 28 as the number of vent ports 16e, i.e., a plurality of discharge ports, may be provided, and the gap G2 may communicate with the exterior of the clamping jig 16 through the discharge ports 28 for discharging the zinc gas 22 with more ease.

In the above embodiments, the workpieces are in the form of galvanized steel sheets. However, the workpieces may be in the form of aluminum-plated steel sheets, chromium-plated steel sheets, or the like.

With the laser beam welding methods according to the present embodiments, as described above, a gap or a discharge port having a desired size for diffusing a gas is formed between the superposed surfaces regardless of the position or shape of the steel sheets or the way in which the steel sheets are clamped, for diffusing and discharging a gas which is produced from the metal of the surface-treated layers when the steel sheets are welded. Consequently, sputtering and internal defects are prevented from being caused, and the steel sheets can stably be welded with laser beams, resulting in a product of excellent quality.

The laser beam welding method according to the present invention is not limited to the above embodiments, but various changes may be made thereto without departing from the scope of the invention.

In the present embodiments, the clamping jig has a circular (truly circular) opening defined in the holder thereof. However, the opening may have any desired shape, e.g., an elliptical shape or a polygonal shape.

The invention claimed is:

1. A laser beam welding method for welding, with laser beams, first and second workpieces stacked one on the other, which comprise metal sheets including superposed surfaces, at least one of the superposed surfaces being surface-treated, comprising:
    the first step of clamping a portion of the first workpiece around a welding spot with a clamping jig having an opening;
    the second step of, after the first step, applying one of the laser beams to the welding spot to form a melted region;
    the third step of, after the second step, applying the one of the laser beams to a portion of the first workpiece around the melted region to form a heated region, thereby forming a gap between the superposed surfaces of the first workpiece and the second workpiece; and
    the fourth step of, after the third step, applying the other of the laser beams to the welding spot to weld the first workpiece and the second workpiece to each other, and diffusing, into the gap, a gas which is produced from surface-treated layers during a period in which the first workpiece and the second workpiece are welded to each other.

2. The laser beam welding method according to claim 1, wherein the clamping jig has at least one vent port communicating with the exterior of the clamping jig, and the heated region includes a forming-missing portion corresponding to the vent port.

* * * * *